(12) United States Patent
De Smet et al.

(10) Patent No.: US 9,102,770 B2
(45) Date of Patent: Aug. 11, 2015

(54) PROCESS FOR THE MANUFACTURE OF ISOTACTIC POLYPROPYLENE

(75) Inventors: Evi De Smet, Oud-Ileverlee (BE); Lodewijk Hendrickx, Meerhout (BE); Werner Verwimp, Tessenderlo (BE); Marc Verheijen, Geel (BE); Paul Allemeersch, Tessenderlo (BE); Erwin Vanzeir, Kappellen (BE); Francisus Jacobs, Evergem (BE); Yvo Daniels, Zonhoven (BE); Kristof Storms, Sinaai-Waas (BE)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/129,020

(22) PCT Filed: Jul. 5, 2012

(86) PCT No.: PCT/EP2012/063138
§ 371 (c)(1),
(2), (4) Date: Feb. 22, 2014

(87) PCT Pub. No.: WO2013/004781
PCT Pub. Date: Jan. 10, 2013

(65) Prior Publication Data
US 2014/0171606 A1    Jun. 19, 2014

(30) Foreign Application Priority Data
Jul. 7, 2011    (EP) .................................... 11173031

(51) Int. Cl.
| C08F 2/00 | (2006.01) |
| C08F 4/44 | (2006.01) |
| C08F 110/06 | (2006.01) |
| C08F 10/06 | (2006.01) |

(52) U.S. Cl.
CPC .............. *C08F 110/06* (2013.01); *C08F 10/06* (2013.01)

(58) Field of Classification Search
CPC .......... C08F 10/06; C08F 110/06; C08F 2/14; C08F 4/651; C08F 2/001; C08F 4/6493; C08F 2500/15; C08F 4/6494
USPC .................................. 526/89, 142, 216, 351
See application file for complete search history.

(56) References Cited

U.S. PATENT DOCUMENTS

| 4,113,802 | A | 9/1978 | Matteoli et al. |
| 4,211,670 | A * | 7/1980 | Vandenberg ................ 502/107 |
| 4,534,953 | A | 8/1985 | Goko et al. |
| 6,337,377 | B1 | 1/2002 | Ebara et al. |
| 2014/0171606 | A1 * | 6/2014 | De Smet et al. ............. 526/142 |

FOREIGN PATENT DOCUMENTS

| CN | 1102415 A | 5/1995 |
| CN | 1107163 A | 8/1995 |
| EP | 0099026 A2 | 1/1984 |
| EP | 0409492 A1 | 1/1991 |
| EP | 0643079 B1 | 10/2000 |
| EP | 1726602 A1 | 11/2006 |
| JP | 59-12905 | 1/1984 |
| JP | 11-504957 A | 5/1999 |
| JP | 2004-527607 A | 9/2004 |
| KR | 10-2008-0016580 | 2/2008 |
| WO | 96/34899 A1 | 11/1996 |
| WO | 02/070568 A1 | 9/2002 |
| WO | 02092640 A1 | 11/2002 |

OTHER PUBLICATIONS

Riichiro Chujo et al. "Two-site model analysis of 13C n.m.r. of polypropylene polymerized by Ziegler-Natta catalyst with external alkoxysilane donors", Polymer, 1994, vol. 35, No. 2.
Tetsuo Hayashi et al. "Heptad configurational analysis of 13C n.m.r. spectra in highly isotactic polypropylene", Polymer, 1988, vol. 29, January.
Japanese 1st Office Action dated Feb. 19, 2015.
Korean Notice of Grounds for Rejection dated May 11, 2015.
First Chinese Office Action dated Mar. 23, 2015.
R.P. Quirk et al. Physical Constants of Poly(propylene)*, Institute of Polymer Science, University of Akron, Akron, Ohio.

* cited by examiner

*Primary Examiner* — William Cheung
(74) *Attorney, Agent, or Firm* — Tarolli, Sundheim, Covell & Tummino LLP

(57) ABSTRACT

Slurry polymerization process for the preparation of a polypropylene (PP) having a decaline soluble fraction (DS) of equal or below 2.5 wt.-%, wherein (a) a Ziegler-Natta catalyst (ZN), (b) propylene and optionally ethylene and/or an $C_4$ to $C_{12}$ α-olefin, and (c) a diluent (D) comprising a donor agent (DA), are fed into a first reactor vessel (R1) and the polymerization of said polypropylene (PP) takes place in at least said first reactor (R1).

14 Claims, No Drawings

PROCESS FOR THE MANUFACTURE OF ISOTACTIC POLYPROPYLENE

This application is the U.S. national stage of International Application No. PCT/EP2012/0631338 filed Jul. 5, 2012, and claims benefit under U.S.C. 119 of European Application No. EP 11173013.3 filed Jul. 7, 2011. All of which are Incorporated by reference herein in their entirety.

The present invention is directed to a new process for the manufacture of an isotactic polypropylene produced in the presence of a Ziegler-Natta catalyst.

Polypropylene is the material of choice for many end applications. Depending on the technical area applied, the polypropylene must be tailored accordingly. For instance polypropylenes used as dielectricum in capacitors must be clean and must have rather high isotacticity.

In the earlier days, only clean polypropylene with standard isotacticity of around 95% (decaline soluble fraction around 4 wt.-%) was available. These polymer types have been produced with a Ziegler-Natta catalyst of the first generation.

Meanwhile, clean polypropylenes (with low catalyst residue content) became available with isotacticities up to at least 97 to 98% (decaline soluble fraction: 1.0 to 1.5 wt.-%). These polypropylenes are obtainable from a slurry polymerization process in which a Ziegler-Natta catalyst of the second generation is employed. Even though the polypropylenes are clean, relatively high amounts of catalyst must be used as the catalyst activity dropped with the increase of isotacticity.

Thus the object of the present invention is to provide a process which enables a person skilled in the art to produce a clean polypropylene of high isotacticity under conditions assuring that the catalyst activity remains on a high level.

The finding of the present invention is that the propylene polymerization must be conducted in a slurry polymerization process, using a Ziegler-Natta catalyst, wherein a diluent is used containing a donor agent.

Accordingly the present invention is directed to a slurry polymerization process for the preparation of a polypropylene (PP) having a decaline soluble fraction (DS) of equal or below 2.5 wt.-%, wherein
(a) a Ziegler-Natta catalyst (ZN),
(b) propylene and optionally ethylene and/or an $C_4$ to $C_{12}$ α-olefin, and
(c) a diluent (D) comprising a donor agent (DA),
are fed into a first reactor vessel (R1) and the polymerization of said polypropylene (PP) takes place in at least said first reactor (R1).

It has been surprisingly found out that the slurry polymerization process according to this invention is featured by high catalyst activity and leads to a polypropylene (PP) of high isotacticity. Further the polypropylene is very clean, i.e. the ash content is below 30 ppm.

The term "slurry polymerization process" is understood as known in the art.

Accordingly a slurry polymerization process means according to this invention a polymerization process in which solid polymer, i.e. the polypropylene (PP), is formed in a liquid polymerization medium. The liquid medium preferably comprises at least 50 wt.-% of the diluent (D).

The slurry polymerization process according to this invention is in particular understood as an industrial scale process. It is well known that in industrial scale processes problems occur which do not occur for instance in a laboratory scale process. Thus approaches may known form laboratory work are not necessarily practicable for large scales. A special finding of the present invention is therefore to provide a large scale slurry polymerization process for the preparation of a polypropylene (PP) having a decaline soluble fraction (DS) of equal or below 2.5 wt.-% under conditions assuring that the catalyst activity remains on a high level.

The term "polymerization reactor" or "reactor", like "first reactor (R1)" or "second reactor (R2)", as used herein shall indicate that the main polymerization takes place in said reactor(s). This definition does not exclude the option that the overall process comprises for instance a pre-polymerization step in a pre-polymerization vessel.

However the term "reactor", in particular the terms "first reactor (R1)" or the "second reactor (R2)", shall indicate that in these reactors the (main) slurry polymerization takes place and not for instance any prepolymerization. Typically in a prepolymerization step low amounts of polymer are produced under mild conditions. Accordingly in the present invention a prepolymerization is preferably understood as a polymerization step in which a weight ratio between polymer, i.e. the polypropylene (PP), and the catalyst, i.e. the Ziegler-Natta catalyst (ZN), is below 1000, more preferably below 700, yet more preferably below 500, still more preferably below 400. Such prepolymerization is typically accomplished at temperatures below 50° C., more preferably below 40° C., yet more preferably below 30° C.

Further the slurry polymerization of the polypropylene (PP) takes place in at least the first reaction vessel (R1). Considering however that the process is used in large scale it is preferred that the slurry polymerization is carried out in at least two reaction vessels, like in two, three, four or five vessels. In case more than one reaction vessel is used, the reaction vessels are connected in series. Preferably in all reaction vessels a slurry polymerization takes place. The main polymerization is accomplished in the first two reaction vessels (R1+R2), i.e. at least 50 wt.-%, more preferably at least 60 wt.-%, still more preferably at least 70 wt.-%, of the polypropylene (PP) is produced in the first two reaction vessels (R1+R2).

Keeping the above in mind the present invention is in particular directed to a slurry polymerization process for the preparation of a polypropylene (PP) having a decaline soluble fraction (DS) of equal or below 2.5 wt.-%,
wherein the polymerization of said polypropylene (PP) takes place in at least two reactors, a first reactor (R1) and a second reactor (R2) connected in series, wherein further
(a) a Ziegler-Natta catalyst (ZN),
(b) propylene and optionally ethylene and/or an $C_4$ to $C_{12}$ α-olefin, and
(c) a diluent (D) comprising a donor agent (DA),
are fed into the first reactor vessel (R1), and
(d1) the reaction temperature in the first reactor vessel (R1) is more than 30° C., and/or
(d2) the polymerization in the first reactor (R1) is no prepolymerization, and/or,
(d3) the weight ratio of the polypropylene (PP) produced in the first reactor (R1) and the Ziegler-Natta catalyst (ZN) present in the first reactor (R1) [weight polypropylene (PP)/weight the Ziegler-Natta catalyst (ZN)] is above 1000/1 preferably above 1500/1, more preferably above 2000/1.

A further essential aspect of the invention is that the diluent (D) comprises a donor agent (DA). It has been found out that the use of the donor agent (DA) within the diluent (D) supports the preparation of higher isotactic polypropylene (PP) whilst keeping the catalyst activity on a high level.

The donor agent (DA) preferably is a compound which normally acts as an external donor (ED) for the Ziegler-Natta catalyst (ZN). Accordingly it is preferred that the donor agent (DA) is an external donor agent (EDA). Even more preferred the donor agent (DA), i.e. the external donor agent (EDA), is selected from the group consisting of methyl formiate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, butyl methacrylate, 2-ethyl 1-hexyl methacrylate, tridecyl methacrylate, ethyl crotonate, dibutyl maleate, diethyl butylmalonate, diethyl dibutylmalonate, ethyl cyclohexanecarboxylate, diethyl 1,2-cyclohexane-dicarboxylate, di-2-ethylhexyl 1,2-cyclohexane-dicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dibutyl phthalate, and dioctyl phthalate.

Even more preferred the donor agent (DA), i.e. the external donor agent (EDA), is selected from the group consisting of methyl methacrylate, butyl methacrylate, 2-ethyl 1-hexyl methacrylate, tridecyl methacrylate. Most preferably the donor agent (DA), i.e. the external donor agent (EDA), is methyl methacrylate.

Preferably the concentration of the donor agent (DA) is relatively low. Accordingly it is appreciated that the amount of donor agent (DA) within the diluent (D) is not more than 300 wt-ppm, more preferably in the range of 10 to 250 wt-ppm, yet more preferably in the range of 20 to 200 wt-ppm The diluent (D) used in the present invention can be any diluent used for the slurry polymerization process. Accordingly the diluent (D) is selected from the group consisting of $C_4$-alkane, $C_5$-alkane, $C_6$-alkane, $C_7$-alkane, $C_8$-alkane, $C_9$-alkane, $C_{10}$-alkane, $C_{11}$-alkane, $C_{12}$-alkane, $C_{13}$-alkane, $C_{14}$-alkane, $C_{15}$-alkane, and mixtures thereof. More preferably the diluent (D) is $C_{10}$-alkane, $C_{11}$-alkane, or a mixture thereof.

In a preferred embodiment of this invention the diluent (D) is a recovered diluent. Accordingly the diluent (D) used in the present slurry polymerization process is recycled. Thus the diluent (D) which has been removed from the slurry polymerization process is purified and donor agent is added (DA). Thereafter the diluent (D) comprising the donor agent (DA) is fed back into the process, in particular fed back into the first reactor vessel (R1). The purification of the diluent (D) is known in the art and not part of this invention. Typically dissolved polymer by-products, like atactic polypropylene, or dissolved material originating from the Ziegler-Natta catalyst, like ether compounds or material originating from the catalyst washing section like alcohol compounds, are removed during the purification from the diluent (D). For example, in the present invention, the alcohol compound, is preferably extracted from the diluent (D) with water. The atactic polypropylene is preferably removed by evaporation of the diluent (D). Finally the diluent (D) is stripped of the light fractions like water and ether, i.e. organic ether (EC). Even though the purification of the diluent (D) is nowadays well advanced not all residues can be fully removed. This applies in particular for the ether compounds, i.e. organic ether (EC). It has now been discovered that with the inventive process polypropylene (PP) with high isotacticity at high catalyst activity is achievable in case recovered diluent (D) containing a donor agent (DA) is used.

Without being bound on the theory it might be that the donor agent (DA) present in the diluent (D) prevents that the ether compounds, i.e. organic ether (EC), (being present in the recovered diluent (D) and/or being part of the Ziegler-Natta catalyst) reduce the isotacticity of the produced polypropylene (PP). It is known that the ether compounds have an adverse effect on isotacticity. It is also known that donor agents (DA), in particular external donors (ED) of the Ziegler-Natta catalysts, like the external donor agents (EDA), preferably as mentioned above, compensate the effect of the ether compounds, i.e. organic ethers (EC), and thus improve isotacticity of a polypropylene. Thus the donor agents (DA) are used as external donors (ED) for Ziegler-Natta catalysts. However the use of such external donors (ED) is accompanied by loss of catalyst activity and thus limited quantities are only applicable. Further it has been observed that at a certain amount of external donors (ED), i.e. external donor agent (EDA), isotacticity cannot be further improved. The finding of the present invention is that these problems can be overcome in case a donor agent (DA) is added at a later stage in the polymerization process. In other words a donor agent (DA) must be fed with the diluent (D), preferably in low concentration, directly into the first reactor vessel (R1). This allows to use Ziegler-Natta catalysts (ZN) comprising no external donor (ED) or Ziegler-Natta catalysts (ZN) comprising the external donor (ED), the latter being preferred. It is in particular possible to use Ziegler-Natta catalysts comprising an external donor (ED), like Ziegler-Natta catalyst (ZN) as defined below, wherein the amount of external donor (ED) is rather low, i.e. preferably below 2000 wt ppm, i.e. 50 to 2000 wt ppm, more preferably below 1000 wt ppm, i.e. 50 to 1000 wt ppm, yet more preferably below 500 wt ppm, i.e. 50 to 500 wt ppm, like below 250 wt ppm, i.e. 50 to 250 wt ppm. The use of such Ziegler Natta catalysts (ZN), i.e. Ziegler Natta catalysts (ZN) comprising an external donor (ED) in low amounts, in the slurry polymerization process according to this invention enables a skilled person to produce polypropylene (PP) with high isotacticity by keeping the catalyst activity on high level.

The preferred Ziegler-Natta catalyst (ZN) used in the present invention is a so called $2^{nd}$ generation Ziegler-Natta catalyst. Especially preferred Ziegler-Natta catalysts (ZN) are those defined in U.S. Pat. No. 4,534,953 and EP 0 099 026 A2, respectively. Both documents are herewith included by reference.

Accordingly it is preferred that the Ziegler-Natta catalyst (ZN) comprises
(a) $TiCl_3$,
(b) an organic aluminum compound (AC),
(c) an organic ether (EC),
(d) a compound of formula (I)

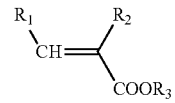

wherein
each $R_1$ and $R_2$ is a hydrogen atom or an alkyl group having from 1 to 3 carbon atoms and
$R_3$ is an alkyl group having at least 6 carbon atoms, and
(e) optionally an external donor (ED).

Preferably the organic aluminum compound (AC) is a trialkyl aluminum such as triethyl aluminum, tripropyl aluminum or tributyl aluminum; a dialkyl aluminum monohalide such as dimethyl aluminum monochloride, diethyl aluminum monochloride, dipropyl aluminum monochloride or diethyl aluminum monobromide; and an alkyl aluminum sesquihalide such as ethyl aluminum sesquichloride; and an alkyl aluminum dihalide such as methyl aluminum dichloride or ethyl aluminum dichloride.

Accordingly it is in particular preferred that the organic aluminum compound (AC) is selected from the group consisting of triethyl aluminum, tripropyl aluminum, tributyl aluminum, dimethyl aluminum chloride, diethyl aluminum chloride, and dipropyl aluminum chloride. In one preferred embodiment the organic aluminum compound (AC) is diethyl aluminum chloride.

The organic ether (EC) is preferably a dialkylether, a dialkenylether or an alkylalkenylether. Accordingly the organic ether (EC) is preferably selected from the group consisting of diethylether, di-n-propylether, di-n-butylether, di-n-amylether, di-n-hexylether, di-n-heptylether, di-n-octylether, di-n-decylether, di-n-dodecylether, n-amyl-n-butylether, n-butyl-n-octylether, n-propyl-n-hexylether, bis(1-butenyl)ether, bis(1-octenyl)ether and propyl-1-butenylether. Even more preferred the organic ether (EC) is selected from the group consisting of diethylether, di-n-propylether, di-n-butylether, di-n-amylether, and di-n-hexylether. In one embodiment the organic ether (EC) is dibutylether, i.e. di-n-butylether.

The compounds represented by general formula (I) includes hexyl, heptyl, octyl, decyl, dodecyl, tridecyl and octadecyl esters of acrylic acid; hexyl, heptyl, octyl, decyl, dodecyl, tridecyl and octadecyl esters of methacrylic acid; hexyl, heptyl, octyl, decyl, dodecyl, tridecyl and octadecyl esters of crotonic acid; hexyl, heptyl, octyl, decyl, dodecyl, tridecyl and octadecyl esters of isocrotonic acid; hexyl, heptyl, octyl, decyl, dodecyl, tridecyl and octadecyl esters of angelic acid; and hexyl, heptyl, octyl, decyl, dodecyl, tridecyl and octadecyl esters of tiglic acid.

Among these ester compounds, those represented by the general formula (I) wherein at least one of $R_1$ and $R_2$ is a hydrogen atom and the other is a hydrogen atom or a methyl group, and $R_3$ is an alkyl group having from 6 to 18 carbon atoms, are preferred.

Thus it is especially preferred that the compound of formula (I) is selected from the group consisting of hexyl ester of methacrylic acid, heptyl ester of methacrylic acid, octyl ester of methacrylic acid, 2-ethylhexyl ester of methacrylic acid, decyl ester of methacrylic acid, dodecyl ester of methacrylic acid, tridecyl ester of methacrylic acid and octadecyl ester of methacrylic acid. In one specific embodiment the compound of formula (I) is tridecyl ester of methacrylic acid.

As mentioned above the preferred Ziegler-Natta catalyst (ZN) used in the inventive slurry polymerization process is well known and disclosed in U.S. Pat. No. 4,534,953 and EP 0 099 026 A2. Accordingly concerning its preparation it is referred to the two documents.

In case the Ziegler-Natta catalyst (ZN) shall contain an external donor (ED) it is preferred that it is a donor agent (DA) as defined above. Accordingly it is preferred that the external donor (ED) is selected from the group consisting of methyl methacrylate, butyl methacrylate, 2-ethyl 1-hexyl methacrylate, and tridecyl methacrylate. Most preferably the external donor (ED) is methyl methacrylate.

In case the Ziegler-Natta catalyst (ZN) contains an external donor (ED), this donor is preferably added to the catalyst before the catalyst is fed into the first reactor vessel (R1).

Different to the Ziegler-Natta catalysts of the $3^{rd}$ and $4^{th}$ generation, the Ziegler-Natta catalyst preferably used in the present invention, i.e. the $2^{nd}$ generation, is non-supported, i.e. does not comprise a silica support material or magnesium-chloride support.

Apart from the diluent (D) comprising the donor agent (DA) and the Ziegler-Natta catalyst (ZN) which are fed into the first reactor vessel (R1) also monomers must be fed in. Depending on whether the polypropylene (PP) is a propylene homopolymer (H-PP) or a propylene random copolymer (R-PP), propylene and optionally ethylene and/or an $C_4$ to $C_{12}$ α-olefin is fed at least into the first reactor vessel (R1). The amount of propylene and optionally other comonomers used depends very much on the desired end product. In case the polypropylene is a propylene-ethylene random copolymer, or containing any other higher alpha olefin as a comonomer, a typical comonomer feed in the first reactor vessel (R1) is in the range of 1 to 10 wt.-%, preferably less than 5 wt.-%.

The reaction temperature in the slurry polymerization process, in particular in the first reactor vessel (R1), is preferably at least 30° C., more preferably at least 40° C., yet more preferably at least 50° C., still more preferably at least 60° C., like at least 65° C. Accordingly it is appreciated that the reaction temperature in the slurry polymerization process, in particular in the first reactor vessel (R1), is in the range of 40 to 100° C., more preferably in the range of 50 to 80° C., still more preferably in the range of 60 to 80° C., more preferably in the range of 65 to 75° C.

The pressure in the slurry polymerization process, in particular in the first reactor vessel (R1), is preferably in the range of 8 to 9 barg, more preferably in the range of 8.5 to 9.0 barg.

The residence time of the polypropylene (PP) in the first reactor (R1) is preferably at least 0.4 hour, more preferably in the range of 0.45 to 0.60 hour. In each reactor vessel subsequent to the first reactor vessel (R1), the residence time is at least 0.6 hour, more preferably in the range of 0.7 to 1.1 hour.

Further the weight ratio of the polypropylene (PP) produced in the first reactor (R1) and the Ziegler-Natta catalyst (ZN) present in the first reactor (R1) [weight polypropylene (PP)/weight the Ziegler-Natta catalyst (ZN)], or in other words the catalyst activity, is equal or more than 1000/1 [g/g] more preferably equal or more than 1500/1 [g/g], still more preferably equal or more than 2000/1 [g/g], like equal or more than 2500/1 [g/g].

The polypropylene (PP) obtained by the slurry polymerization process of the present invention is featured by a high isotacticity. Accordingly the polypropylene (PP) of the slurry polymerization process of the present invention has a decaline soluble fraction (DS) of equal or below 2.5 wt.-%, more preferably of equal or below 2.0 wt.-%, yet more preferably equal or below 1.6 wt.-%, still more preferably equal or below 1.0 wt.-%. Accordingly the polypropylene (PP) of the slurry polymerization process of the present invention has preferably a decaline soluble fraction (DS) in the range of 0.2 to 2.5 wt.-%, more preferably in the range of 0.2 to 2.0 wt.-%, still more preferably in the range of 0.2 to 1.8 wt.-%, yet more preferably in the range of 0.2 to 1.5 wt-%, like in the range of 0.2 to 1.0 wt.-%.

Accordingly the polypropylene (PP) of the slurry polymerization process of the present invention has a n-heptane soluble fraction (HS) of equal or below 3.5 wt.%, more preferably of equal or below 2.5 wt.-%, yet more preferably equal or below 2.0 wt.-%, still more preferably equal or below 1.3 wt.-%. In preferred embodiments the polypropylene (PP) of the slurry polymerization process of the present invention has preferably a n-heptane soluble fraction (HS) in the range of 0.5 to 3.5 wt.-%, more preferably in the range of 0.5 to 2.5 wt.-%, yet more preferably in the range of 0.5 to 2.0 wt-%, like in the range of 0.5 to 1.3 wt.-%.

Preferably the polypropylene (PP) of the present invention has a relatively high crystallinity, featured by a high melting temperature $Tp_m$ and crystallization temperature $Tp_c$. Accordingly it is preferred that the polypropylene (PP) has (a) a melting temperature $Tp_m$, determined by differential scanning calorimetry, preferably above 159° C., more preferably above 160° C., yet more preferably in the range of 160 to 165° C.,
and/or
(b) a crystallization temperature $Tp_c$, determined by differential scanning calorimetry, above 111° C., more preferably above 112° C., yet more preferably in the range of 112 to 117° C.,
and/or
(c) a crystallinity, determined by differential scanning calorimetry, above 48%, more preferably above 50%, still more preferably above 54%.

Preferably the polypropylene (PP) of the present invention has a melt flow rate $_{MFR2}$ (230° C.) measured according to ISO 1133 in the range of 1 to 10 g/10 min, more preferably in the range of 1.5 to 8.0 g/10 min.

Preferably the polypropylene (PP) of the present invention is further featured by a broad molecular weight distribution (MWD), defined as Mw/Mn. Accordingly the polypropylene (PP) preferably has a molecular weight distribution (MWD) above 4.0, more preferably in the range of 5.0 to 10.0, yet more preferably in the range of 5.5 to 8.0, still yet more preferably in the range of 5.5 to 7.5.

Additionally the polypropylene (PP) can be defined by its molecular weight. Thus the polypropylene (PP) preferably has a weight average molecular weight (Mw) measured by gel permeation chromatography (GPC; ISO 16014-1/-2/-4) in the range of 200,000 to 800,000 g/mol, more preferably in the range of 350,000 to 650,000 g/mol.

Due to the specific process the obtained polypropylene (PP) of the present invention contains low amounts of catalyst residues. Thus the polypropylene (PP) has preferably an ash content of below 50 ppm, more preferably below 30 ppm, even more preferably below 20 ppm.

The polypropylene (PP) is a propylene homopolymer (H-PP) or a random propylene copolymer (R-PP), the former especially preferred.

The expression propylene homopolymer used in the present invention relates to a polypropylene that consists substantially, i.e. of more than 99.7 wt.-%, still more preferably of at least 99.8 wt.-%, of propylene units. In a preferred embodiment only propylene units in the propylene homopolymer are detectable. The comonomer content is determined with FT infrared spectroscopy.

In case the polypropylene (PP) is a random propylene copolymer (R-PP) it is appreciated that the random propylene copolymer (R-PP) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP) according to this invention comprises, especially consists of, monomers copolymerizable with propylene from the group consisting of ethylene, 1-butene and 1-hexene. More specifically the random propylene copolymer (R-PP) comprises—apart from propylene—units derivable from ethylene and/or 1-butene. In a preferred embodiment the random propylene copolymer (R-PP) comprises units derivable from ethylene and propylene only.

Additionally it is appreciated that the random propylene copolymer (R-PP) has preferably a comonomer content in the range of more than 0.3 to 1.0 wt.-%, more preferably in the range of more than 0.3 to 0.8 wt.-%, yet more preferably in the range of more than 0.3 to 0.7 wt.-%.

The term "random" indicates that the comonomers of the random propylene copolymer (R-PP) are randomly distributed within the propylene copolymer. The term random is understood according to IUPAC (Glossary of basic terms in polymer science; IUPAC recommendations 1996).

The present invention will now be described in further detail by the examples provided below.

EXAMPLES

1. Definitions/Measuring Methods

The following definitions of terms and determination methods apply for the above general description of the invention as well as to the below examples unless otherwise defined.

NMR-Spectroscopy Measurements:

The $^{13}$C-NMR spectra of polypropylenes were recorded on Bruker 400 MHz spectrometer at 130° C. from samples dissolved in 1,2,4-trichlorobenzene/benzene-d6 (90/10 w/w). For the triad analysis the assignment is done according to the methods described in literature: T. Hayashi, Y. Inoue, R. Chëjö, and T. Asakura, Polymer 29 138-43 (1988) and Chujo R, et al, Polymer 35 339 (1994).

The NMR-measurement was used for determining the mmmm pentad concentration in a manner well known in the art.

Molecular Weight Averages, Molecular Weight Distribution:

Molecular weight averages (Mw, Mn), molecular weight distribution (MWD) described by Mw/Mn (wherein Mn is the number average molecular weight and Mw is the weight average molecular weight) were determined by Gel Permeation Chromatography (GPC) at 140° C. according to ASTM D 6474-99; ISO 16014-1/-2/-4, by using 1,2,4-trichlorobenzene (TCB) as the solvent.

$MFR_2$ (230° C.) is measured according to ISO 1133 (230° C., 2.16 kg load).

Melting temperature (peak melting temperature $Tp_m$) and enthalpy ($\Delta H_f$), crystallization temperature (peak crystallization temperature $Tp_c$) and enthalpy ($\Delta H_c$), in accordance ISO 11357-3:

Measured with Mettler TA820 differential scanning calorimetry (DSC) on 5 to 10 mg samples.

DSC is run according with the temperature scan described in ISO 11357-3 with a scan rate of 10° C/min in the temperature range of +23 to +210° C. Crystallization temperature and enthalpy ($\Delta H_c$) are determined from the cooling step, while melting temperature and melting enthalpy ($\Delta H_f$) are determined from the second heating step. Melt temperature, crystallization temperature, heat of fusion $\Delta H_f$ (J/g) and heat of crystallization $\Delta H_c$(J/g) are determined as described in the standardized method. The degree of crystallinity, is % crystallinity=100×$\Delta Hf/\Delta H100$%; where $\Delta H100$%; (J/g) is 209.0 J/g for polypropylene (Polymer handbook, J Brandrup & E. H. Immergut, Eds, 3rded., John Wiley & Sons, New York 1989).

Quantification of Comonomer Content by FTIR Spectroscopy:

The comonomer content is determined by quantitative Fourier transform infrared spectroscopy (FTIR) after basic assignment calibrated via quantitative $^{13}$C nuclear magnetic resonance (NMR) spectroscopy in a manner well known in the art. Thin films of a thickness of between 100-500 µm are pressed and spectra recorded in transmission mode.

Specifically, the ethylene content of a polypropylene-co-ethylene copolymer is determined using the baseline corrected peak area of the quantitative bands found at 720-722 and 730-733 $cm^{-1}$. Quantitative results are obtained based upon reference to the film thickness.

Decaline Solubles (DS):

A 2 g polymer sample is dissolved in 100 ml stabilised decahydronaphthalene (=decaline) by heating at 160° C. and stirring for 1 hr. The solution is cooled at room temperature for one hour and then placed in a water bath at 25° C. for 1 hour. The solution is filtrated. 20 ml of the filtrate is transferred quantitatively in a tarred aluminum pan. The pan is placed on a hot plate at 195° C., blanketed with a slow stream of nitrogen. When the residue in the pan is almost dry, the pan is placed in a vacuum oven at 140° C. for 2 hours.

The total solids concentrate of the filtrate is as a measure for the soluble fraction.

Calculated as decaline soluble={(gram of residue)/(gram of sample)}×5×100% n-Heptane Soluble (HS):

A 5 g polymer sample is subjected to extraction in boiling n-heptane for one hour in a Kumagawa glass extractor. The solution is cooled to 60° C. The extractor is then placed in a vacuum oven at 90° C. for one hour, then cooled down to room temperature for 15 min.

The n-heptane soluble fraction is defined as 100 minus Isotactic Index, which Isotactic Index is calculated in % as $\{(B/A)\times 100$, with:

A=weight polymer before extraction (g)
B=weight polymer after extraction (g)

Ash Content:

A 100 g polymer sample (weight to 0.01 mg accuracy) is put in an accurately weighted clean platinum crucible (weight to 0.01 mg accuracy) and combusted completely over a gas burner. The crucible with retained content after burning is then placed in an electric furnace at 1000° C. for 15 minutes. Crucible with content is allowed to cool for 3 hrs in an extractor. Crucible and content is accurately weighted to 0.01 mg accuracy.

Ash content is being calculated as $\{(C-A)/B\}\times 1,000,000$=ppm ash whereas:

A=weight empty crucible (g)
B=weight polymer sample (g)
C=weight crucible plus content after ashing (g)

2. Examples

Comparative Example 1

The slurry polymerisation took place in 5 continuous stirred tank reactors in series. A diluent (without methyl methacrylate), consisting of a mix of alkanes, roughly 10% $C_{10}$ and 90% $C_{11}$ isomers, having a density of 0.76 kg/l has been fed to the first reactor. Propylene and a catalyst batch have been fed to the first reactor. Propylene is fed to the second reactor as well. The catalyst batch contains a Ziegler-Natta catalyst of the second generation and the same diluent composition as mentioned above. The Ziegler-Natta catalyst comprises based on the weight of catalyst batch 1.6 wt.-% $TiCl_3$, 1.5 wt.-% di-ethyl aluminum chloride and 125 wt ppm methyl methacrylate as an external donor.

The temperature is slightly different in all 5 continuous stirred tank reactors and varies from 68.5° C. in the first reactor to 75° C. in the last reactor. The pressure in the first reactor is controlled at 8.7 barg.

The obtained isotactic polypropylene has been purified in a known manner, by separating of by-products, like atactic polypropylene, and the catalyst residues.

The obtained isotactic polypropylene had a decaline soluble fraction (DS) of 3.5 wt.-%; corresponding to n-heptane solubles of 4.5 wt-% and a melting temperature of 160.1° C. Catalyst activity was 3.18 kg PP/g catalyst.

Comparative Example 2

The same process conditions as in the comparative example 1 have been used. Different thereto is that the catalyst composition now contains 2580 wt-ppm methyl methacrylate as an external donor. The obtained isotactic polypropylene has been purified in the same known manner, by separating of by-products, like atactic polypropylene, and the catalyst residues like in the comparative example 1.

The obtained isotactic polypropylene had a decaline soluble fraction (DS) of 1.5 wt.-%; corresponding to n-heptane solubles of 2.0 wt-% and a melting temperature of 162.0° C. Catalyst activity dropped to 1.70 kg PP/g catalyst.

Inventive Example 1

The same process conditions as in the comparative example 1 have been used. Also the same catalyst has been used. Different thereto, the diluent being fed to the first polymerization reactor contained now 20 wt-ppm of methyl methacrylate.

After purification the obtained isotactic polypropylene had a decaline soluble fraction (DS) of 1.0 wt.-%; corresponding to n-heptane solubles of 1.3 wt-% and a melting temperature of 163.1° C. Catalyst activity was the same as for the comparative example 1.

The invention claimed is:

1. Slurry polymerization process for the preparation of a polypropylene (PP) having a decaline soluble fraction (DS) of equal or below 2.5 wt. %, comprising: feeding into a first reactor vessel (R1),
    (a) a Ziegler-Natta catalyst (ZN),
    (b) propylene and optionally ethylene and/or an $C_4$ to $C_{12}$ α-olefin, and
    (c) a diluent (D) comprising a donor agent (DA); wherein the polymerization of said polypropylene (PP) takes place in at least said first reactor (R1) and said slurry polymerization process is an industrial scale process, and comprises at least two reactors, the first reactor (R1) and a second reactor (R2) connected in series.

2. Slurry polymerization process according to claim 1, wherein
    the reaction temperature in the first reactor vessel (R1) is more than 30° C., and/or,
    the polymerization in the first reactor (R1) is no prepolymerization, and/or,
    the weight ratio of the polypropylene (PP) produced in the first reactor (R1) and the Ziegler-Natta catalyst (ZN) present in the first reactor (R1) [weight polypropylene (PP) / weight the Ziegler-Natta catalyst (ZN)] is above 1000/1 [g/g].

3. Slurry polymerization process according to claim 1, wherein the donor agent (DA) is an external donor agent (EDA) for the Ziegler-Natta catalyst (ZN).

4. Slurry polymerization process according to claim 1, wherein the Ziegler-Natta catalyst (ZN) fed into the first reactor vessel (R1) comprises an external donor agent (EDA).

5. Slurry polymerization process according to claim 1, wherein the donor agent (DA) is:
    (a) selected from the group consisting of methyl formate, ethyl acetate, vinyl acetate, propyl acetate, octyl acetate, cyclohexyl acetate, ethyl propionate, methyl butyrate, ethyl valerate, ethyl stearate, methyl chloroacetate, ethyl dichloroacetate, methyl methacrylate, butyl methacrylate, 2-ethyl 1-hexyl methacrylate, tridecyl methacrylate, ethyl crotonate, dibutyl maleate, diethyl butylmalonate, diethyl dibutylmalonate, ethyl cyclohexanecarboxylate, diethyl 1, 2-cyclohexane-dicarboxylate, di-2-ethylhexyl 1, 2-cyclohexane-dicarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, dimethyl phthalate, diethyl phthalate, dibutyl phthalate, and dioctyl phthalate; or
(b) methyl methacrylate.

6. Slurry polymerization process according to claim 1, wherein:
(a) the amount of donor agent (DA) within the diluent (D) is in the amount of 20 to 200 wt-ppm, and/or
(b) wherein the Ziegler-Natta catalyst (ZN) is a $2^{nd}$ generation Ziegler-Natta catalyst.

7. Slurry polymerization process according to claim 1, wherein the Ziegler-Natta catalyst (ZN) comprises:
(a) $TiCl_3$,
(b) an organic aluminum compound (AC),
(c) an organic ether (EC),
(d) a compound of formula (I)

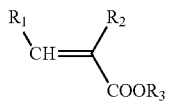

wherein each $R_1$ and $R_2$ is a hydrogen atom or an alkyl group having from 1 to 3 carbon atoms, and
$R_3$ is an alkyl group having at least 6 carbon atoms, and
(e) optionally an external donor (ED).

8. Slurry polymerization process according to claim 7, wherein:
(a) the organic aluminum compound (AC) is selected from the group consisting of triethyl aluminum, tripropyl aluminum, tributyl aluminum, dimethyl aluminum chloride, diethyl aluminum chloride, and dipropyl aluminum chloride, and/or
(b) the organic ether (EC) is selected from the group consisting of diethylether, di-n-propylether, di-n-butylether, di-n-amylether, and di-n-hexylether.

9. Slurry polymerization process according to claim 8, wherein
(a) the compound of formula (I) is selected from the group consisting of hexyl ester of methacrylic acid, heptyl ester of methacrylic acid, octyl ester of methacrylic acid, 2-ethylhexyl ester of methacrylic acid, decyl ester of methacrylic acid, dodecyl ester of methacrylic acid, tridecyl ester of methacrylic acid and octadecyl ester of methacrylic acid, and/or
(b) the external donor (ED) being the donor agent (DA).

10. Slurry polymerization process according to claim 1, wherein the diluent (D) is selected from the group consisting of $C_4$-alkane, $C_5$-alkane, $C_6$-alkane, $C_7$alkane, $C_8$-alkane, $C_9$-alkane, $C_{10}$-alkane, $C_{11}$-alkane, $C_{12}$-alkane, $C_{13}$-alkane, $C_{14}$-alkane, $C_{15}$-alkane, and mixtures thereof.

11. Slurry polymerization process according to claim 1, wherein the diluent (D) is a recovered diluent, said recovered diluent (D) being a diluent which has been removed from the slurry polymerization process, purified, mixed with the donor agent (DA) and subsequently fed back into the first reactor vessel (R1).

12. Slurry polymerization process according to claim 1, wherein the produced polypropylene (PP) is a propylene homopolymer (H-PP).

13. Slurry polymerization process according to claim 1, wherein
(a) at least 50 wt. % of the polypropylene (PP) is produced in the two reactors (R1+R2), and/or
(b) in the first reactor vessel (R1) the reaction temperature is in the range of 40 to 100° C.

14. Slurry polymerization process according to claim 1, wherein the polypropylene (PP) has:
(a) a melting temperature Tpm determined by differential scanning calorimetry above 159° C., and/or
(b) a crystallization temperature Tpc determined by differential scanning calorimetry above 111° C.

* * * * *